(12) United States Patent
Fukino

(10) Patent No.: US 8,482,871 B2
(45) Date of Patent: Jul. 9, 2013

(54) LENS BARREL AND IMAGE CAPTURING DEVICE

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/059,809

(22) PCT Filed: Aug. 20, 2009

(86) PCT No.: PCT/JP2009/003998
§ 371 (c)(1), (2), (4) Date: Feb. 18, 2011

(87) PCT Pub. No.: WO2010/021150
PCT Pub. Date: Feb. 25, 2010

(65) Prior Publication Data
US 2011/0149420 A1 Jun. 23, 2011

(30) Foreign Application Priority Data

Aug. 21, 2008 (JP) .................................. 2008-213360
Oct. 2, 2008 (JP) .................................. 2008-257562
Jul. 14, 2009 (JP) .................................. 2009-166161

(51) Int. Cl.
*G02B 7/02* (2006.01)
*G02B 15/14* (2006.01)

(52) U.S. Cl.
USPC ........... 359/823; 359/824; 359/694; 359/696; 359/700; 396/72

(58) Field of Classification Search
USPC .............. 359/694–704, 823, 824; 396/72–75, 396/349, 439; 348/208.4
See application file for complete search history.

(56) References Cited

U.S. PATENT DOCUMENTS 4,980,771 A 12/1990 Ueda et al.
5,818,647 A * 10/1998 Nishio et al. .................. 359/700

(Continued)

FOREIGN PATENT DOCUMENTS

JP H02-210314 A 8/1990
JP H06-174998 A 6/1994

(Continued)

OTHER PUBLICATIONS

International Search Report mailed Nov. 24, 2009 in International Application No. PCT/JP2009/003998 (withEnglish translation).

(Continued)

*Primary Examiner* — Loha Ben
(74) *Attorney, Agent, or Firm* — Oliff & Berridge, PLC

(57) ABSTRACT

Provided is a lens barrel including a subject-side lens guided by guide bars, comprising a first guide shaft that is disposed within a cylindrical fixed cylinder and oriented along an axial direction of the fixed cylinder; a second guide shaft that is disposed outside the fixed cylinder and oriented along the axial direction, and arranged such that at least a portion thereof overlaps with the first guide shaft in a longitudinal direction of the first guide shaft; a first holding member that holds a first lens, includes a first engaging member that engages with the first guide shaft, and moves along the first guide shaft; and a second holding member that holds a second lens positioned on a subject side of the first lens, includes a second engaging member that engages with the second guide shaft, and moves along the second guide shaft, wherein at least a portion of movement range of the first engaging member on the first guide shaft overlaps in the axial direction with at least a portion of movement range of the second engaging member on the second guide shaft.

22 Claims, 14 Drawing Sheets

U.S. PATENT DOCUMENTS

| | | | |
|---|---|---|---|
| 5,995,302 A * | 11/1999 | Ito | 359/700 |
| 6,081,391 A * | 6/2000 | Nishio et al. | 359/700 |
| 6,493,153 B2 * | 12/2002 | Funatsu | 359/694 |
| 6,995,926 B2 | 2/2006 | Hayashi | |
| 7,321,470 B2 * | 1/2008 | Matsumoto et al. | 359/694 |
| 7,746,564 B2 * | 6/2010 | Miyamoto | 359/696 |
| 7,796,347 B2 * | 9/2010 | Ito | 359/696 |
| 7,808,731 B2 * | 10/2010 | Ishimoda et al. | 359/826 |
| 8,018,661 B2 * | 9/2011 | Ito | 359/696 |
| 2004/0062537 A1 | 4/2004 | Nomura | |
| 2006/0093339 A1 | 5/2006 | Umezu | |

FOREIGN PATENT DOCUMENTS

| | | |
|---|---|---|
| JP | H08-248288 A | 9/1996 |
| JP | 2005-241842 A | 9/2005 |
| JP | 2006-126718 A | 5/2006 |

OTHER PUBLICATIONS

Aug. 30, 2012 Office Action issued in Chinese Patent Application No. 200980132624.6 (with translation).

* cited by examiner

LENS BARREL AND IMAGE CAPTURING DEVICE

TECHNICAL FIELD

The present invention relates to a lens barrel and an image capturing device. The contents of the following Japanese patent application are incorporated herein by reference,
No. 2008-213360 filed on Aug. 21, 2008,
No. 2008-257562 filed on Oct. 2, 2008, and
No. 2009-166161 filed on Jul. 14, 2009.

BACKGROUND ART

Patent Document 1, shown below, discloses a lens barrel that includes a moving cylinder, which moves relative to a fixed cylinder while being guided by guide pipes provided on the fixed cylinder, and a front group lens that is guided by guide bars arranged on the moving cylinder.

Patent Document 2, shown below, discloses a lens barrel including guide bars that provide guidance in a movement direction and a lens frame that holds a lens and has a sleeve engaging with the guide bars. A cam follower is arranged on the sleeve, and the lens frame is moved in the direction of the optical axis of the lens according to the rotation of a cam cylinder having a cam groove that engages with the cam follower.

PRIOR ART DOCUMENTS

Patent Documents

Patent Document 1: Japanese Patent Application Publication No. H02-210314
Patent Document 2: Japanese Patent Application Publication No. H06-174998

DISCLOSURE OF THE INVENTION

Problems to be Solved by the Invention

The lens barrels described above each have configurations in which the front group lens moves independently relative to the guide bars. However, the rear group lens moves relative to the moving cylinder, and therefore cannot move independently with respect to the movement of the front group lens. Furthermore, if a plurality of lens groups that move independently are provided on a single guide bar, this guide bar must have a length corresponding to the amount of movement, but a structure including such a guide bar results in a larger lens barrel. In a conventional lens barrel, impact from the outside can affect the cam groove and cam follower, causing damage to the cam groove or cam follower.

Means for Solving the Problems

According to a first aspect of the present invention, provided is a lens barrel (100) comprising a first guide shaft (142) that is disposed within a cylindrical fixed cylinder (140) and oriented along an axial direction of the fixed cylinder; a second guide shaft (194) that is disposed outside the fixed cylinder and oriented along the axial direction, and arranged such that at least a portion thereof overlaps with the first guide shaft in a longitudinal direction of the first guide shaft; a first holding member (122) that holds a first lens (124), includes a first engaging member (161) that engages with the first guide shaft, and moves along the first guide shaft; and a second holding member (112) that holds a second lens (114) positioned on a subject side of the first lens, includes a second engaging member (117) that engages with the second guide shaft, and moves along the second guide shaft, wherein at least a portion of movement range of the first engaging member on the first guide shaft overlaps in the axial direction with at least a portion of movement range of the second engaging member on the second guide shaft.

According to a second aspect of the present invention, provided is a lens barrel (200) comprising a lens holding member (212) that holds a lens (211); a guide shaft (242) that guides movement of the lens holding member; and a cam member (250) that includes a first cam surface (251) engaging with a first cam follower (217) disposed on the lens holding member and a second cam surface (252) engaging with a second cam follower (219) disposed on the lens holding member, and that drives the lens holding member along the guide shaft as a result of the first cam follower engaging with the first cam surface, wherein the cam member has a space between the second cam follower and the second cam surface.

According to a third aspect of the present invention, provided is an image capturing device (400) comprising the lens barrel (200) described above and an image capturing unit (300) that captures an image using the lens.

Figure 1:
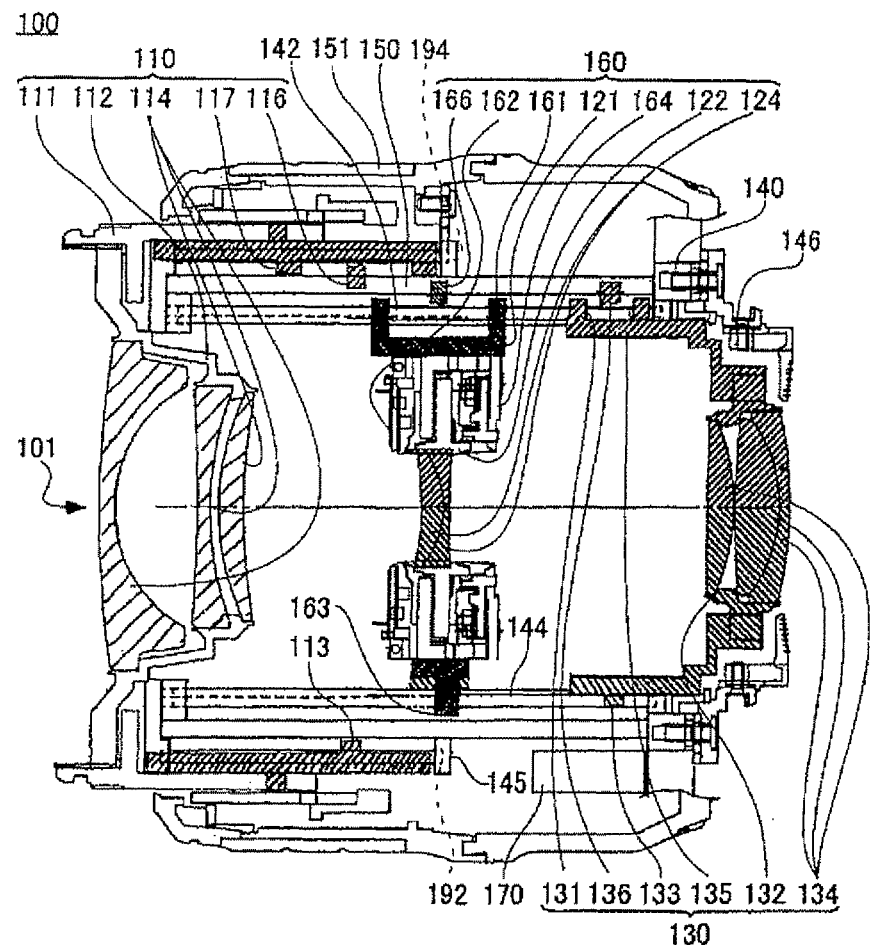
FIG. 1 is a cross-sectional view of the lens barrel 100.

LIST OF REFERENCE NUMERALS 100, 200 lens barrel; 101, 201 image capturing optical system; 110 front group unit; 111 front cylinder; 112, 122, 132 lens frame; 113, 133, 163, 269, 218, 279 U-shaped groove; 114 first lens group; 116, 136, 166, 268, 278 cam follower; 117, 131, 161 engaging member; 118 screw; 119 screw hole; 121 middle cylinder; 124 second lens group; 130 rear group unit; 134 third lens group; 135 rear cylinder; 137, 167 V-shaped groove; 138, 141, 158 notch; 139, 169 flat spring; 140, 240 fixed cylinder; 142, 144, 192, 194, 242, 261 guide bar; 143, 147, 149 bearing portion; 145 rib; 146 base; 152, 154, 156 cam groove; 150 cam cylinder; 151 zoom ring; 160 intermediate unit; 162, 264 diaphragm section; 164, 262 vibration correcting section; 170 microcomputer; 210 first group; 211 front lens; 212, 265, 275 lens frame; 213 male lead; 214 lead ring; 216 sliding cylinder; 217 driving cam follower; 215, 267, 277 engaging portion; 219 buffering cam follower; 220 zoom ring; 222 stopper; 241 opening; 244 mount section; 246 cover; 250 cam cylinder; 251, 253, 254 driving cam; 252 buffering cam; 258 notch; 260 second group; 266, 276 lens; 270 third group; 300 image capturing unit; 310 image capturing element; 312 optical filter; 320 shutter; 330 distance measuring section; 340 main mirror; 342 secondary mirror; 350 main control section; 360 mount section; 370 pentaprism; 372 focusing screen; 380 photometric unit; 390 finder optical system; 392 half mirror; 394 finder LCD; 396 main LCD; 400 image capturing device.

BEST MODE FOR CARRYING OUT THE INVENTION

Hereinafter, some embodiments of the present invention will be described. The embodiments do not limit the invention according to the claims, and all the combinations of the features described in the embodiments are not necessarily essential to means provided by aspects of the invention.

FIG. 1 shows a cross section of an entire lens barrel 100. The lens barrel 100 includes an image capturing optical system 101 that contains a first lens group 114, a second lens group 124, and a third lens group 134. The lens barrel 100 includes a mechanism for adjusting the focal position, focal distance, or the like by moving at least one of the lens groups along an optical axis of the image capturing optical system 101. The first lens group 114, the second lens group 124, and the third lens group 134 are respectively held by lens frames 112, 122, and 132.

The fixed cylinder 140 includes a base 146 connected to other components such as the camera body, and the fixed cylinder 140 does not move relative to the camera body when the lens barrel 100 is mounted. Furthermore, the fixed cylinder 140 supports a guide bar 142 and a guide bar 144 in parallel to each other at opposite positions in the radial direction thereof.

The fixed cylinder 140 also includes guide bars 192 and 194, forming a pair. In FIG. 1, the guide bars 192 and 194 on the outside are arranged in the same cross-sectional plane as the guide bars 142 and 144. However, this is merely meant to show that the outer guide bars 192 and 194 are arranged outside the fixed cylinder 140.

The first lens group 114 is supported by the front cylinder 111 via the lens frame 112, and forms a front group unit 110 that includes the front cylinder 111 and the lens frame 112. The front cylinder 111 is supported together with the guide bars 192 and 194 as a result of an engaging member 117 and a U-shaped groove 113 engaging with the outer guide bars 192 and 194, and is driven by a cam cylinder 150 via a cam follower 116. As a result, the front group unit 110 moves relative to the fixed cylinder 140 along the optical axis of the image capturing optical system 101, together with the first lens group 114. More specifically, the front group unit 110 moves toward a subject side, which is the left side of FIG. 1, and toward an image side, which is the right side of FIG. 1.

The second lens group 124 is supported by the middle cylinder 121 via the lens frame 122. The middle cylinder 121 holds a diaphragm section 162 and a vibration correcting section 164 to form an intermediate unit 160. The vibration correcting section 164 corrects vibration, due to hand shaking or the like, by moving such that the second lens group 124 has a component in a direction substantially orthogonal to the image capturing optical system 101.

Figure 5:
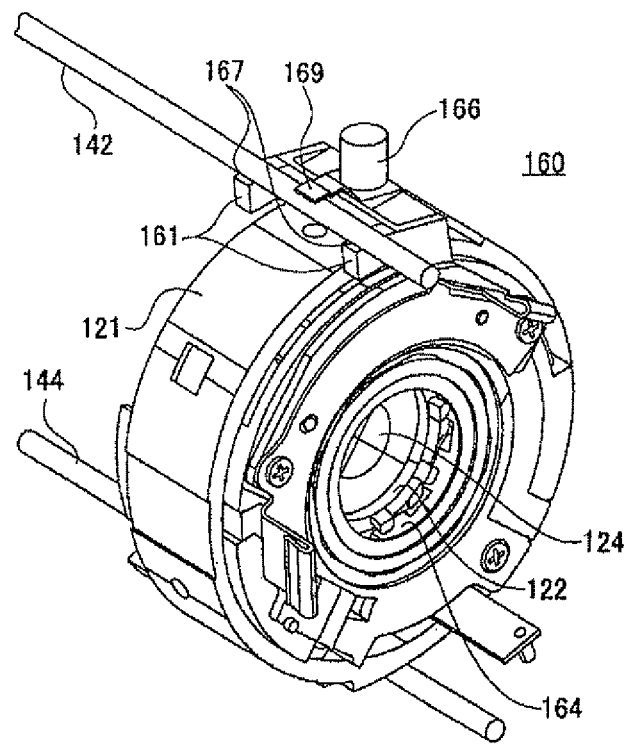
FIG. 5 is a perspective view of the intermediate unit 160.
Figure 6:
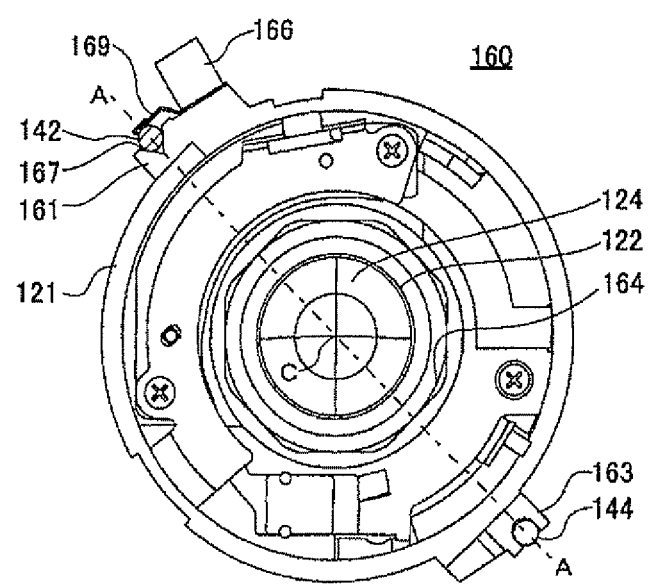
FIG. 6 is a rear view of the intermediate unit 160.

The middle cylinder 121 moves relative to the fixed cylinder 140 along the optical axis of the image capturing optical system 101, as a result of a U-shaped groove 163 of an engaging member 161 engaging with the guide bars 142 and 144, as shown in FIGS. 5 and 6. As a result, the second lens group 124 and the lens frame 122 held in the middle cylinder 121 also move along the guide bars 142 and 144.

Concerning the longitudinal positioning of the guide bars 142, 144, 192, and 194, the guide bars 142 and 144 within the fixed cylinder 140 and the guide bars 192 and 194 outside the fixed cylinder 140 have overlapping regions in which the engaging members 117 and 161 and the U-shaped grooves 113 and 163 are guided. The cam cylinder 150 is arranged between (i) the guide bars 142 and 144 and (ii) the guide bars 192 and 194, and drives the front group unit 110, which is positioned radially outward, and the intermediate unit 160, which is positioned radially inward.

The third lens group 134 is held by the rear cylinder 135 via the lens frame 132. The rear cylinder 135 and the lens frame 132 form the rear group unit 130. The rear cylinder 135 moves relative to the fixed cylinder 140 along the optical axis of the image capturing optical system 101, as a result of the engaging member 131 and the U-shaped groove 133 engaging with the guide bars 142 and 144. As a result, the third lens group 134 and the lens frame 132 held in the rear cylinder 135 also move along the guide bars 142 and 144.

The intermediate unit 160 and the rear group unit 130 are arranged within the fixed cylinder 140. The front group unit 110 is arranged outside the fixed cylinder 140. The cam cylinder 150 can rotate on the same rotational center as the fixed cylinder 140, according to operation of a zoom ring 151 provided on the outer circumference of the lens barrel 100.

As described further below, the cam cylinder 150 drives the front group unit 110, the intermediate unit 160, and the rear group unit 130 via the cam followers 116, 136, and 166. The following describes each element individually.

Furthermore, the lens barrel 100 houses a microcomputer 170 in addition to the above components. The microcomputer 170 performs communication control when electric signals are transmitted to or received from a device outside the lens barrel 100.

Figure 2:
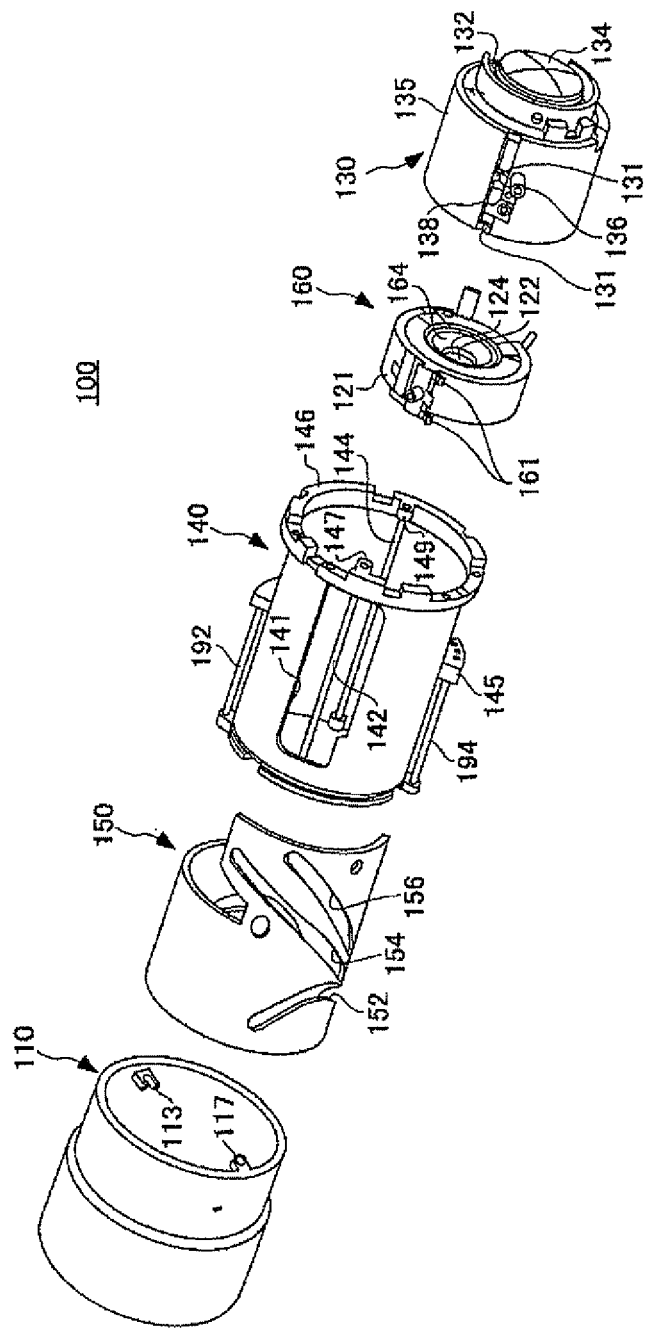
FIG. 2 is an exploded perspective view of the lens barrel 100.

FIG. 2 is an exploded perspective view of the lens barrel 100. The lens barrel 100 is formed by assembling the front group unit 110, the cam cylinder 150, the fixed cylinder 140, the intermediate unit 160, and the rear group unit 130, in an order beginning from the left side of FIG. 2, which corresponds to the subject side, i.e. the front side.

The lens barrel 100 is assembled by sequentially performing a step of mounting one end of each of the guide bars 142 and 144, in this case the subject side ends, in the fixed cylinder 140 and a step of mounting the intermediate unit 160 and the rear group unit 130 from the other ends, i.e. the image side ends, of the guide bars 142 and 144. Furthermore, a step of mounting the guide bars 192 and 194 outside the fixed cylinder 140 and a step of mounting the front group unit 110 on the guide bars 192 and guide bar 194 are sequentially performed. These two sets of steps can be performed in any order. In the following description, the subject side end of each component is referred to as the "front end." The image side end of each component is referred to as the "back end."

Figure 3:
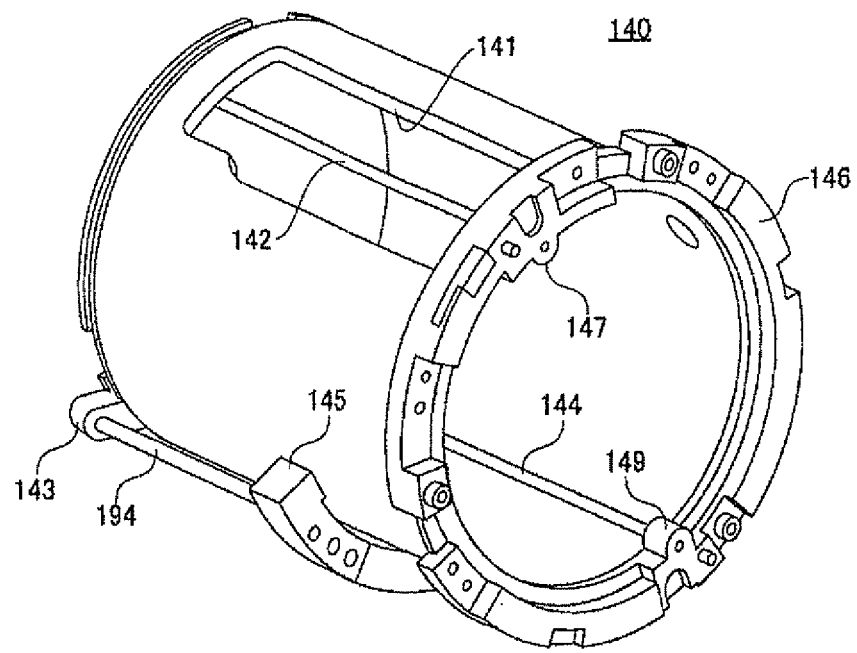
FIG. 3 is a perspective view of the fixed cylinder 140.
Figure 4:
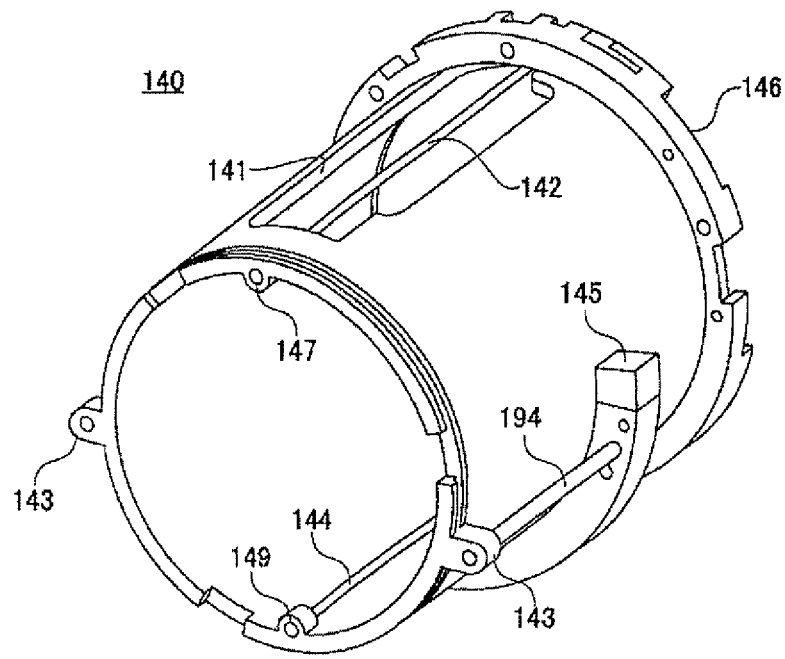
FIG. 4 is another perspective view of the fixed cylinder 140.

FIG. 3 is a perspective view looking down on the fixed cylinder 140 diagonally from the back of the lens barrel 100. FIG. 4 is a perspective view looking down on the fixed cylinder 140 diagonally from the front of the lens barrel 100.

The fixed cylinder 140 has an overall cylindrical shape, and includes the guide bars 142, 144, 192, and 194 and a base 146. The base 146 is a ring-shaped component formed at the back end of the fixed cylinder 140, and has a mount for fixing other components to the lens barrel 100. Notches 141 are formed in the circumferential surface of the fixed cylinder 140, and the function of these notches 141 is described further below.

The pair of guide bars 142 and 144 are arranged within the fixed cylinder 140 to be parallel to the longitudinal direction of the cylinder. As shown in FIG. 3, the back ends of the guide bars 142 and 144 on the image side of the lens barrel 100, i.e. the right side of FIG. 3, are inserted through the bearing portions 147 and 149 to be supported. As shown in FIG. 4, the front ends of the guide bars 142 and 144 on the subject side of the lens barrel 100, i.e. the left side of FIG. 4, are also inserted through the bearing portions 147 and 149 to be supported. As a result, the positions of the guide bars 142 and 144 are fixed at both ends, thereby preventing skewing of the guidance direction.

The other pair of guide bars 192 and 194 are arranged outside the fixed cylinder 140 to be parallel to the longitudinal direction of the cylinder. As shown in FIGS. 3 and 4, the back ends, i.e. image side ends, of the guide bars 192 and 194 are inserted into and supported by a rib 145 formed on the outer circumference of the fixed cylinder 140 at the approximate longitudinal center thereof. As shown in FIG. 4, the front ends of the guide bars 142 and 144 are inserted into and supported by a bearing portion 143 formed at the front end of the fixed cylinder. As a result, the positions of the guide bars 192 and 194 are fixed at both ends, thereby preventing skewing of the guidance direction.

FIG. 5 is a perspective view of the intermediate unit 160. FIG. 6 is a rear view of the intermediate unit 160. In FIGS. 5 and 6, a portion of the intermediate unit 160 is not shown.

As shown in FIG. 5, the intermediate unit 160 moves along the guide bars 142 and 144 while being supported by the guide bars 142 and 144 via the engaging member 161. Since the guide bar 142 is gripped by the flat spring 169 and the V-shaped groove 167 of the engaging member 161, the intermediate unit 160 does not slip with respect to the guide bar 142.

The intermediate unit 160 includes a cam follower 166 adjacent to the engaging member 161 in the circumferential direction. As a result, the intermediate unit 160 is driven by the cam groove 154 of the cam cylinder 150 as described further below. Therefore, in the image capturing optical system 101, the second lens group 124 can move along the optical axis.

As shown in FIG. 6, the middle cylinder 121 of the intermediate unit 160 includes the engaging member 161 and the U-shaped groove 163. The engaging member 161 and the U-shaped groove 163 are arranged symmetrically with respect to the center C in the radial direction of the middle cylinder 121, as shown by the dashed line A. As a result, the U-shaped groove 163 is arranged far from the engaging member 161 in the radial direction of the middle cylinder 121.

Accordingly, gaps between the U-shaped groove 163 and the guide bar 144 and between the engaging member 161 and the guide bar 142 can be restricted. By accurately setting the position of the second lens group 124 in a plane orthogonal to the optical axis, the center C of the second lens group 124 can be prevented from becoming skewed from the optical axis of the image capturing optical system 101.

The V-shaped groove 167 of the engaging member 161 is symmetric in the circumferential direction of the middle cylinder 121 with respect to the dashed line A. In this way, the surfaces formed by the V-shaped groove 167 may be symmetric with respect to a plane including the guide bar 142 and the optical axis of the image capturing optical system 101. As a result, the combined force exerted by the surfaces of the V-shaped groove 167 pressing on the guide bar 142 is centered toward the optical axis of the image capturing optical system 101, and therefore the position of the second lens group 124 in a plane orthogonal to the optical axis can be stabilized.

Figure 7:
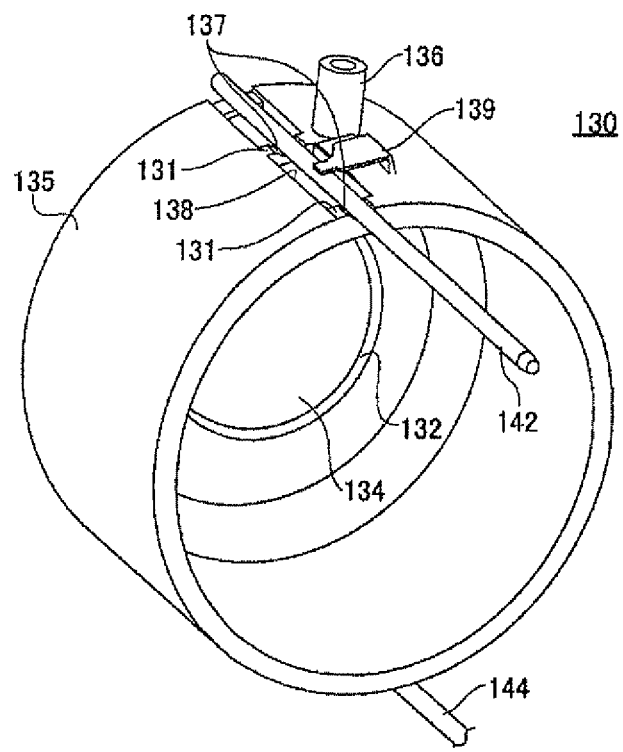
FIG. 7 is a perspective view of the rear group unit 130.
Figure 8:
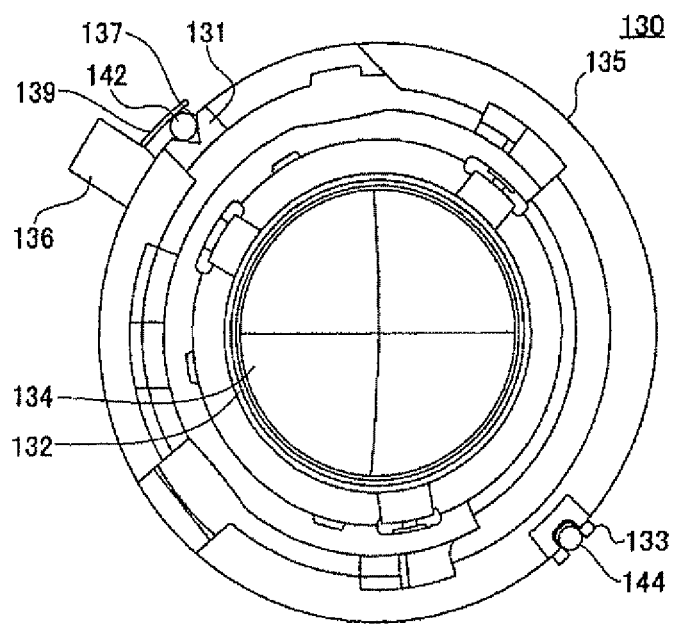
FIG. 8 is a rear view of the rear group unit 130.

FIG. 7 is a perspective view looking down on the rear group unit 130 diagonally from the front of the lens barrel 100. FIG. 8 is a rear view of the rear group unit 130 looking from directly behind the lens barrel 100.

In the rear group unit 130, the rear cylinder 135 is held within the third lens group 134 via the lens frame 132. The engaging members 131, the cam follower 136, and the U-shaped groove 133 are formed on the outer circumferential surface of the rear cylinder 135.

The lens frame 132 and the third lens group 134 held in the lens frame 132 are arranged near the back end of the rear cylinder 135, i.e. the left side of FIG. 7. The engaging members 131 are arranged closer to the front end of the rear cylinder 135, i.e. the right side of FIG. 7. Therefore, the third lens group 134 is arranged closer to the image side than the engaging member 131, with respect to the optical axis of the image capturing optical system 101.

A notch 138 is formed on the outer circumferential surface of the rear cylinder 135 along the length thereof. A plurality of engaging members 131 are formed along the circumference of the rear cylinder 135 in the region in which the notch 138 is formed. In this way, it would appear that a portion of the rear cylinder 135 is severed by the notch 138 to be non-continuous in the circumferential direction, but this portion is connected by the engaging members 131 such that the overall shape is a cylinder.

As shown in FIG. 7, the engaging members 131 are arranged to be distanced from each other in the direction in which the guide bar 142 extends. As a result, symmetric slanting of the guide bar 142 and the longitudinal direction of the rear cylinder 135 can be restricted. Furthermore, a V-shaped groove 137 is formed on the top surface of each engaging member 131, having two contact surfaces facing each other and contacting the guide bar 142.

When the rear group unit 130 is viewed from the rear, the cam follower 136 is arranged adjacent to the engaging members 131 on the outer circumferential surface of the rear cylinder 135. The cam follower 136 protrudes radially from the surface of the rear cylinder 135.

One end of the flat spring 139 is fixed to the rear cylinder 135 near the cam follower 136. The other end of the flat spring 139 contacts the guide bar 142. As a result, the flat spring 139 pulls the engaging member 131 against the guide bar 142. Accordingly, the V-shaped groove 137 and the guide bar 142 firmly contact each other. As a result, the center of the third lens group 134 is prevented from being skewed from the optical axis of the image capturing optical system 101.

As shown in FIG. 8, the U-shaped groove 133 engages with the guide bar 144 at a different position than the engaging member 131. The U-shaped groove 133 has a pair of contact surfaces that are parallel to each other and that sandwich the guide bar 144 from both sides in the circumferential direction of the rear cylinder 135. As a result, rotation of the rear cylinder 135 within a plane orthogonal to the optical axis of the image capturing optical system 101 is restricted.

Figure 9:
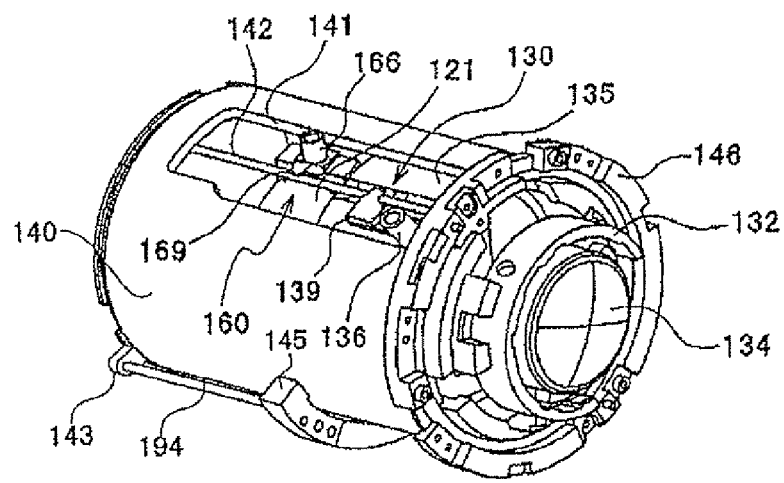
FIG. 9 is a perspective view showing movement of the intermediate unit 160 and the rear group unit 130.

FIG. 9 shows the rear group unit 130 and the intermediate unit 160 mounted in the fixed cylinder 140 and positioned on the back end side of the lens barrel 100. In other words, the intermediate unit 160 and the rear group unit 130 are inserted into the fixed cylinder 140.

The engaging member 131 of the rear cylinder 135 engages with the guide bar 142. The cam follower 136 of the rear cylinder 135 protrudes from the fixed cylinder 140 via the notch 141. The engaging member 161 of the intermediate unit 160 engages with the guide bar 142, and the cam follower 166 is exposed to the outside via the notch 141 of the fixed cylinder 140.

The intermediate unit 160 and the flat springs 169 and 139 of the rear group unit 130 are all thin, and can therefore be accommodated within the thickness range of the fixed cylinder 140. Accordingly, the flat springs 169 and 139 do not protrude to the outside from the outer circumferential surface of the fixed cylinder 140.

The cam followers 166 and 136 are positioned on opposite sides of the guide bar 142 from each other in the circumferential direction of the fixed cylinder 140. Accordingly, the cam followers 166 and 136 do not interfere with each other when they draw near each other in the extension direction of the guide bar 142.

Figure 10:
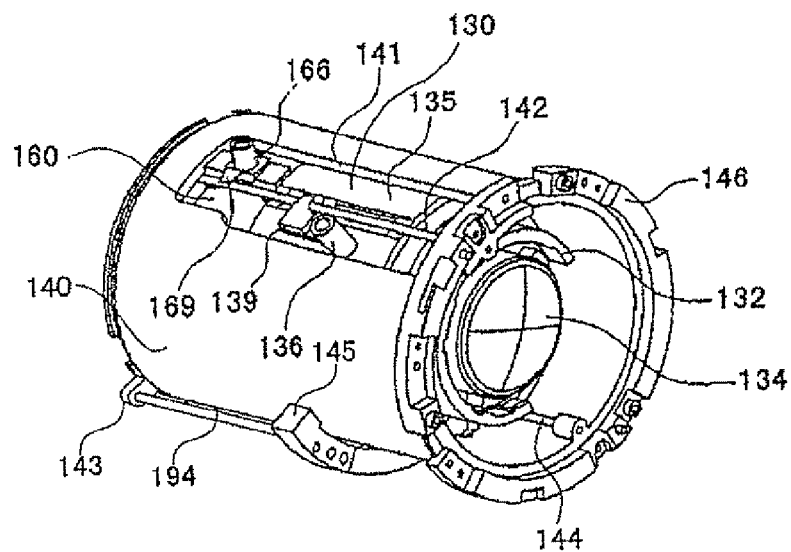
FIG. 10 is a perspective view showing movement of the intermediate unit 160 and the rear group unit 130.

FIG. 10 shows the rear group unit 130 and the intermediate unit 160 mounted on the fixed cylinder 140 and positioned on the front end side of the lens barrel 100. In this state as well, the cam followers 166 and 136 are positioned on opposite sides of the guide bar 142 and therefore do not interfere with each other.

In this way, the cam follower 166 of the intermediate unit 160, and the cam follower 136 of the rear group unit 130 are arranged on opposite sides of the guide bar 142 from each other, in the circumferential direction of the guide bar 142. Accordingly, the pair of cam followers 166 and 136 do not interfere with each other even when they draw near each other in the extension direction of the fixed cylinder 140. Therefore, the movement range of the intermediate unit 160 and the rear group unit 130 is increased while maintaining a configuration in which the intermediate unit 160 and the rear group unit 130 are both guided by a single guide bar 142.

Figure 11:
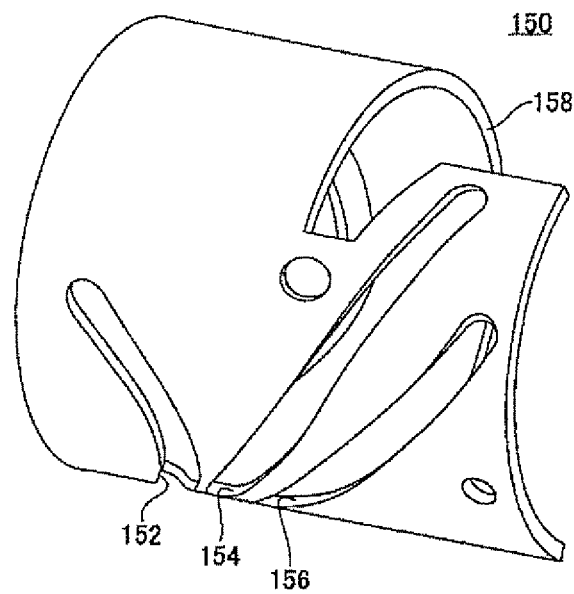
FIG. 11 is a perspective view of the cam cylinder 150.
Figure 12:
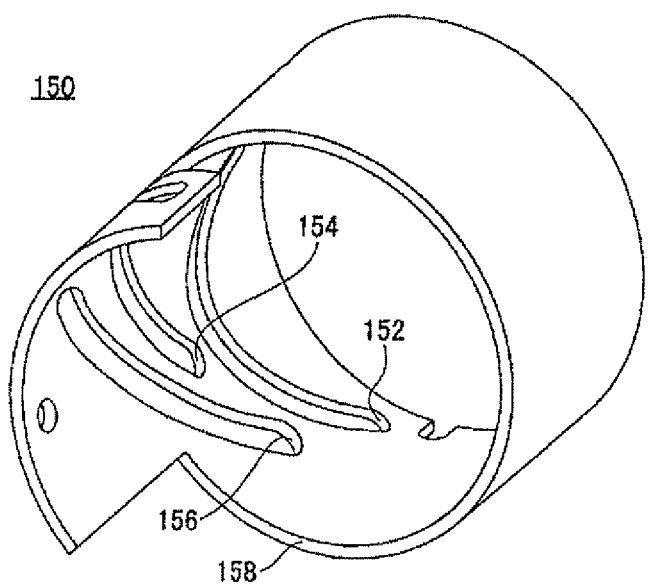
FIG. 12 is another perspective view of the cam cylinder 150.

FIG. 11 is a perspective view looking down on the left surface of a single cam cylinder 150 from behind. FIG. 12 is a perspective view looking down on the right side surface of the cam cylinder 150 from behind.

The cam cylinder 150 has an overall cylindrical shape with a notch 158 formed in a portion of the circumferential surface. The circumferential surface of the cam cylinder 150 has a plurality of cam grooves 152, 154, and 156 formed therein, which extend in both the circumferential and longitudinal directions but do not intersect with each other.

The cam grooves 152, 154, and 156 are formed in the stated order from the front end side of the cam cylinder 150. In a back portion of the cam cylinder 150, the cam grooves 154 and 156 are removed and the notch 158 is formed. In a front portion of the cam cylinder 150, there is no notch 158, and therefore the cam cylinder 150 forms a cylinder. As a result, when attached to the outer circumferential surface of the fixed cylinder 140, the cam cylinder 150 rotates along the outer circumferential surface of the fixed cylinder 140.

Figure 13:
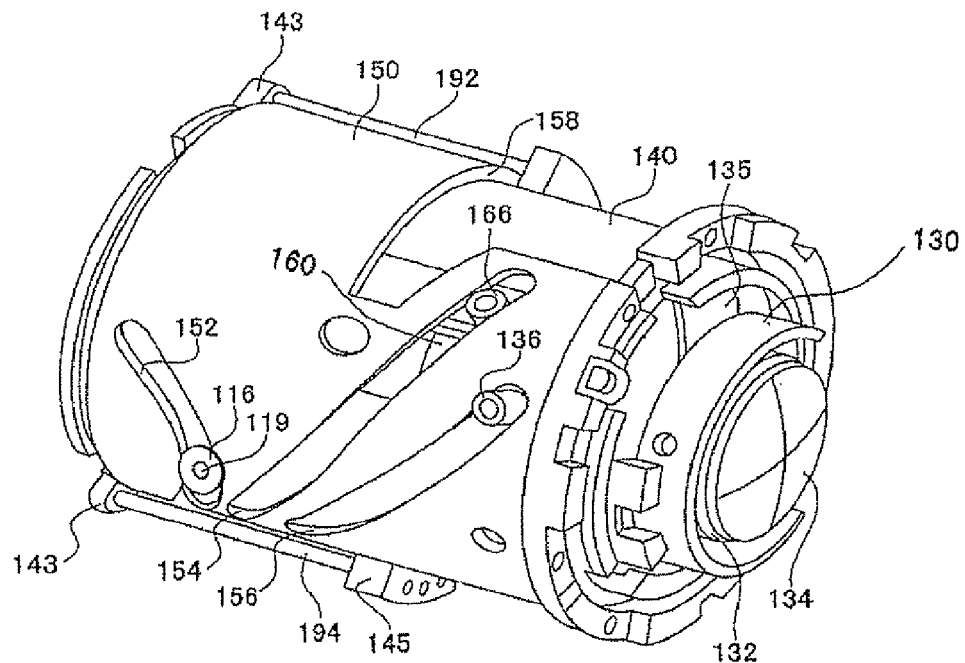
FIG. 13 is a perspective view of an assembly made up of the fixed cylinder 140, the intermediate unit 160, the rear group unit 130, and the cam cylinder 150.

FIG. 13 is a perspective view of the assembly shown in FIGS. 11 and 12 with the cam cylinder 150 attached thereto. Components identical to those in other figures are given the same reference numerals and redundant descriptions are omitted.

The cam cylinder 150 is attached to the outside of an assembly obtained by mounting the rear group unit 130 and the intermediate unit 160 in the fixed cylinder 140. As a result, the cam followers 166 and 136 protruding radially outward from the fixed cylinder 140 engage with the cam grooves 154 and 156.

After the cam cylinder 150 is attached to the outside of the fixed cylinder 140, the cam followers 136 and 166 follow the cam grooves 154 and 156 from the outside of the cam cylinder 150 to be attached to the rear cylinder 135 or the middle cylinder 121. At the stage shown in FIG. 13, the outer guide bars 192 and 194 are exposed above the front portion of the cam cylinder 150.

The cam follower 166 of the intermediate unit 160 engages with the cam groove 154 of the cam cylinder 150. The movement direction of the intermediate unit 160 is limited to the extension direction of the guide bars 142 and 144, by the engaging member 161 and the U-shaped groove 163. Accordingly, when the cam cylinder 150 rotates along the fixed cylinder 140 around the optical axis of the image capturing optical system 101, the cam follower 166 is pressed by the cam groove 154 to move in the direction of the optical axis of the lens barrel 100. In this way, the second lens group 124 held by the middle cylinder 121 moves along the optical axis.

Similarly, the cam follower 136 of the rear group unit 130 engages with the cam groove 156 of the cam cylinder 150. The movement direction of the rear group unit 130 is limited to the extension direction of the guide bars 142 and 144, by the engaging member 131 and the U-shaped groove 133. Accordingly, when the cam cylinder 150 rotates along the fixed cylinder 140 around the optical axis of the image capturing optical system 101, the cam follower 136 is pressed by the cam groove 156 to move in the direction of the optical axis of the lens barrel 100. In this way, the third lens group 134 held by the rear group unit 130 moves along the optical axis.

The cam follower 116 engages independently with the cam groove 152. The cam follower 116 has a screw hole 119 at the center thereof. As a result, when the front group unit 110 is attached as described below, the front cylinder 111 and the cam follower 116 can engage each other.

Figure 14:
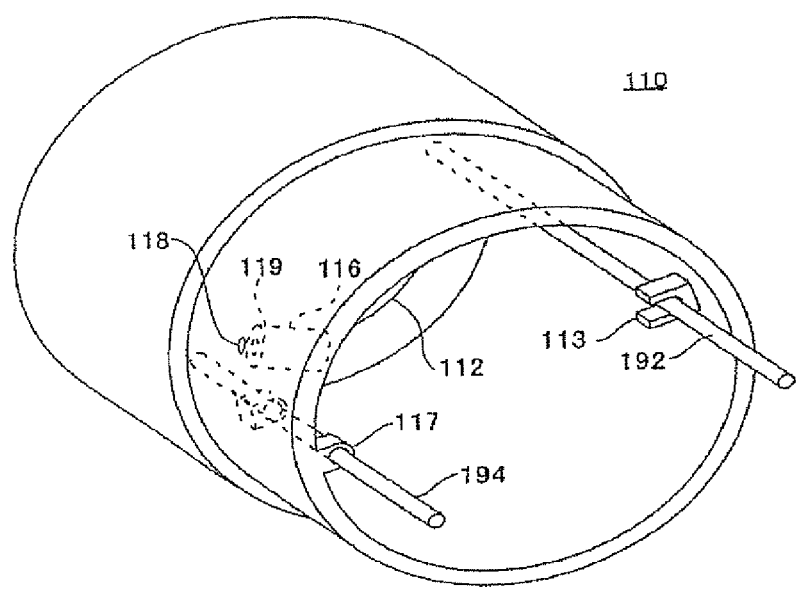
FIG. 14 is a perspective view of the front group unit 110.
Figure 15:
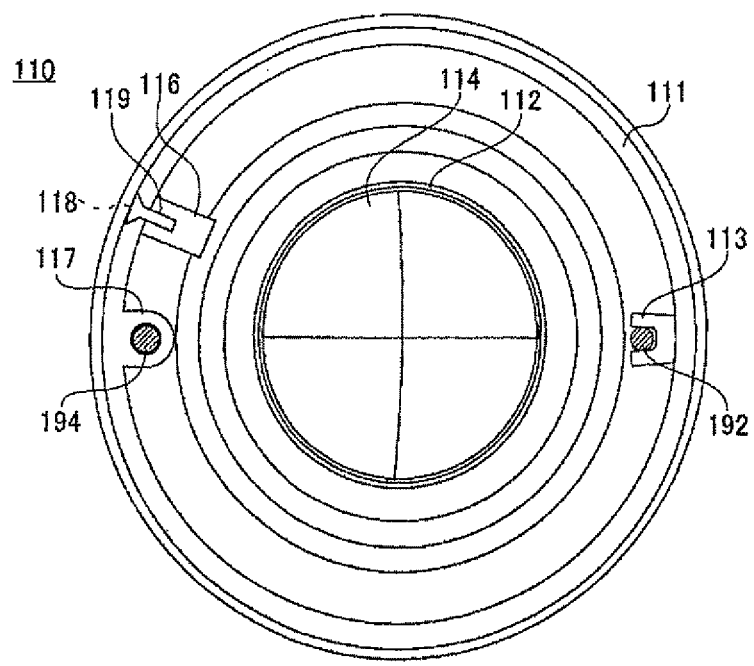
FIG. 15 is a rear view of the front group unit 110.

FIG. 14 is a perspective view of the front group unit 110. FIG. 15 is a rear view of the front group unit 110. As described above, the guide bars 192 and 194 are fixed to the fixed cylinder 140, but are shown together in FIGS. 14 and 15 to more easily show the function of the front group unit 110.

As shown in FIG. 14, the front cylinder unit includes the front cylinder 111, engaging members 117, a U-shaped groove 113, and a cam follower 116. The front cylinder 111 has an overall cylindrical shape, and has the lens frame 112 at the front end thereof, i.e. the left side of FIG. 14. The engaging members 117 and the U-shaped groove 113 are arranged near the back end of the front cylinder 111, i.e. the right side of FIG. 14. As a result, the first lens group 114 is arranged closer to the subject side than the engaging members 117 and the U-shaped groove 113 in the direction of the optical axis of the image capturing optical system 101.

The engaging members 117 and the U-shaped groove 113 are formed inside the front cylinder 111 to protrude radially inward. The positions of the engaging members 117 and the U-shaped groove 113 correspond respectively to the positions of the pair of guide bars 192 and 194 supported by the fixed cylinder 140. Each engaging member 117 has a through-hole with a diameter through which the guide bar 194 can be smoothly inserted. As a result, the front group unit 110 can move smoothly on the guide bars 192 and 194.

The cam follower 116 is arranged near the engaging members 117 in the circumferential direction of the front cylinder 111. When seen from the extension direction of the guide bar 194, the cam follower 116 is arranged near the center of the pair of engaging members 117. As a result, when the cam follower 116 receives a drive force, the drive force is evenly added to the pair of engaging members 117, and so the front group unit 110 moves smoothly. If the front cylinder 111 is made of resin or the like, the engaging members 117 and the U-shaped groove 113 may be formed integrally.

When the front group unit 110 moves, the space between the pair of engaging members 117 supporting the front cylinder 111 does not change. Accordingly, the form of the front cylinder 111 is stable regardless of the position of the front group unit 110, and changes in the optical characteristics of the first lens group 114 can be prevented.

As shown in FIG. 15, the cam follower 116 protrudes inward in the radial direction of the front cylinder 111. As a result, when the front group unit 110 is attached to the lens barrel 100, the cam follower 116 engages with the cam groove 152. Accordingly, when the cam cylinder 150 rotates around the fixed cylinder 140, the cam follower 116 is pressed by the cam groove 152 to drive the entire front group unit 110.

The cam follower 116 is connected to the inside of the front cylinder 111 by the screw 118. Accordingly, as shown in FIG. 13 for example, the front group unit 110 can be mounted on the fixed cylinder 140 by mounting the front cylinder 111 after the cam follower 116 is attached to the cam cylinder 150 and connecting the front cylinder 111 to the cam follower 116 using the screw 118.

Figure 16:
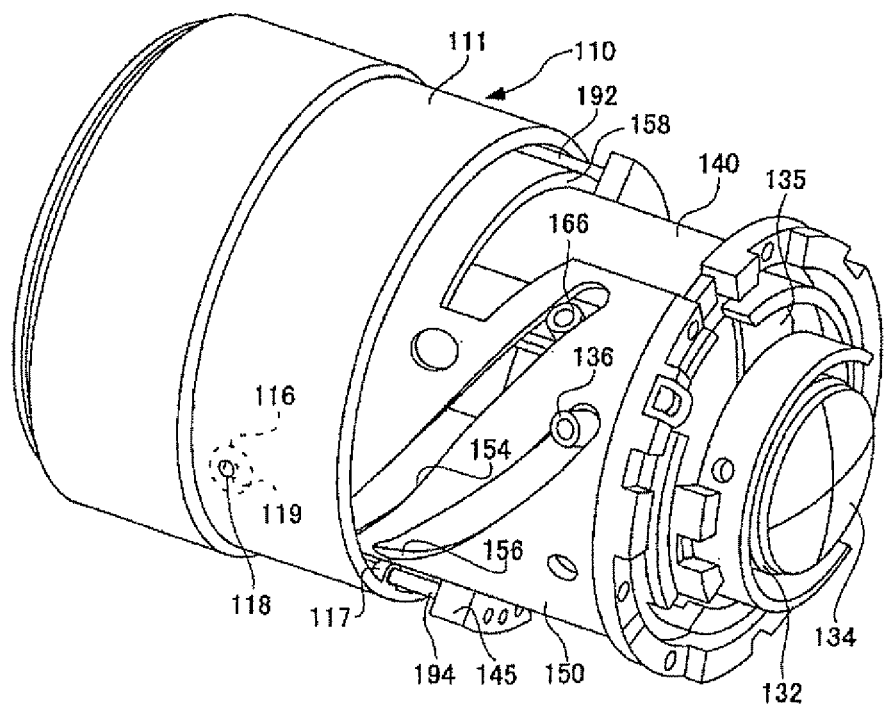
FIG. 16 is a perspective view of the front group unit 110 attached to the assembly of FIG. 13.

FIG. 16 is a perspective view of the front group unit 110 mounted on the assembly shown in FIG. 13. As shown in FIG. 16, the front group unit 110 is mounted on the outside of the assembly, such that the front cylinder 111 encompasses the guide bars 192 and 194 from the outside. As a result, the front group unit 110 holding the first lens group 114 positioned further forward than the front end of the subject side of the fixed cylinder 140 is supported by the guide bars 192 and 194.

As described above, the cam follower 116 protruding inward in the front cylinder 111 engages the cam groove 152 at the front end of the cam cylinder 150, and so when the cam cylinder 150 rotates, the front group unit 110 moves according to the cam profile of the cam groove 152. Accordingly, with a single operation of the cam cylinder 150, the lens barrel 100 can perform a zoom operation with a large magnification, for example.

Figure 17:
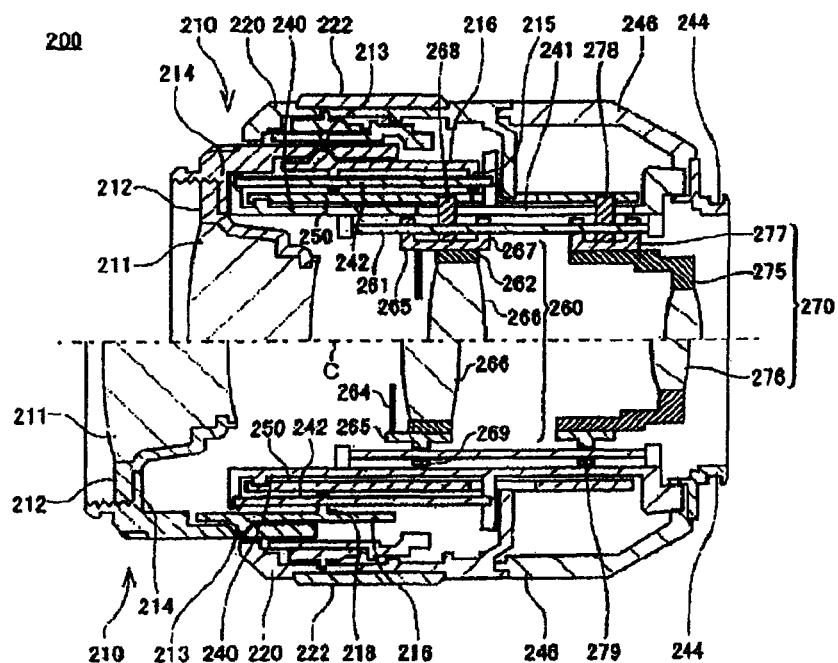
FIG. 17 is a cross-sectional view of the lens barrel 200.

The front group unit 110, the intermediate unit 160, and the rear group unit 130 are guided on the guide bars 142 and 194 respectively by the pairs of engaging members 117, 131, and 161. Accordingly, the front group unit 110, the intermediate unit 160, and the rear group unit 130 each move without distorting the optical axis FIG. 17 is a cross-sectional view of a configuration of the lens barrel 200. The upper half of FIG. 17 shows a state in which the first group 210 is moved back, and the lower half of FIG. 17 shows a state in which the first group 210 is moved forward by a zoom.

The lens barrel 200 includes a fixed cylinder 240, a cam cylinder 250, a sliding cylinder 216, and a zoom ring 220 arranged coaxially on the optical axis C. The fixed cylinder 240 includes a mount section 244 at the back end thereof, i.e. the right side of FIG. 17. The mount section 244 supports the fixed cylinder 240 by engaging with a mount on a body, such as a camera.

The fixed cylinder 240 includes a pair of guide bars 242 on the outside near the front end thereof, i.e. the left side of FIG. 17. Both ends of each guide bar 242 are fixed to the fixed cylinder 240, and the guide bars 242 are parallel to the optical axis C. The cam cylinder 250 is arranged between the fixed cylinder 240 and the guide bars 242, along the circumferential surface of the fixed cylinder 240. The fixed cylinder 240 includes a pair of guide bars 261 on the inner circumference thereof. Both ends of each guide bar 261 are fixed to the fixed cylinder 240, and the guide bars 261 are parallel to the optical axis C.

The sliding cylinder 216 is arranged on the outside of the guide bars 242. The sliding cylinder 216 includes an engaging portion 215 and a U-shaped groove 218 extending inward in the radial direction of the lens barrel 200. In the example of FIG. 17, the engaging portion 215 and the U-shaped groove 218 are arranged along the guide bars 242. The engaging portion 215 and the U-shaped groove 218 each engage with a guide bar 242. As a result, the sliding cylinder 216 is guided by the guide bars 242 to move along a direction parallel to the optical axis C.

The sliding cylinder 216 includes a male lead 213 on the outer surface thereof. The male lead 213 engages with a female lead on the inner circumferential surface of the lead ring 214. As a result, the lead ring 214 can perform focusing by moving relative to the sliding cylinder 216.

The lead ring 214 holds the lens frame 212 therein and extends toward the front of the guide bar 242 on the outside of the sliding cylinder 216. The lens frame 212 holds a front lens 211. With this configuration, the front lens 211 moves along with the movement of the sliding cylinder 216. The front lens 211 is not limited to a single lens, and may be a lens group including a plurality of lenses.

The zoom ring 220 is arranged on the outside of the lead ring 214. When the zoom ring 220 rotates, the cam cylinder 250 also rotates to move the sliding cylinder 216 along the guide bar, thereby integrally moving the sliding cylinder 216 to zoom together with the second group and third group described further below.

A cover 246 provides covering between the back end of the zoom ring 220 and the mount section 244 of the fixed cylinder 240 in order to prevent dust from entering the lens barrel 200. The cover 246 is fixed to the fixed cylinder 240 and does not rotate. The zoom ring 220 includes a stopper 222 that is grasped by a user.

The lens barrel 200 further includes the second group 260 and the third group 270. The second group 260 and the third group 270 are supported by guide bars 261. The second group 260 and the third group 270 receive a drive force from the cam cylinder 250 and are guided by the guide bars 261 to move in the direction of the optical axis C.

The second group 260 includes a diaphragm section 264, a lens 266, a vibration correcting section 262 that corrects vibration of the lens 266, and a lens frame 265 that holds the lens 266 via the vibration correcting section 262. The lens frame 265 includes a pair of engaging portions 267 arranged to be distanced from each other along the guide bars 261, and a U-shaped groove 269 arranged on the opposite side of the optical axis C from the engaging portions 267. The pair of engaging portions 267 engage with one of the guide bars 261 and the U-shaped groove 269 engages with the other guide bar 261, thereby supporting the second group 260 on the guide bars 261 in a manner to allow sliding. The lens frame 265 includes a cam follower 268 that protrudes radially outward.

The third group 270 includes a lens 276 and a lens frame 275 that holds the lens 276. In the same manner as the lens frame 265 of the second group 260, the lens frame 275 includes a pair of engaging portions 277, a U-shaped groove 279, and a cam follower 278. The configuration and operation of the engaging portions 277 and the U-shaped groove 279 is the same as those of the engaging portions 267 and the U-shaped groove 269, and therefore further description is omitted.

Figure 18:
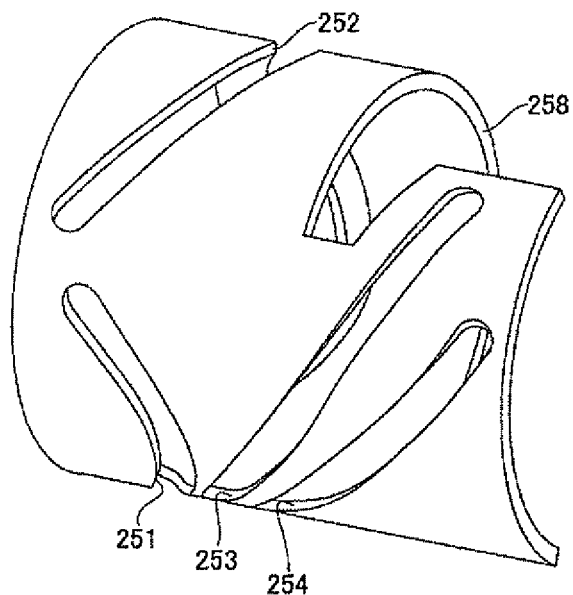
FIG. 18 is a perspective view of an independent cam cylinder 250.

FIG. 18 is a perspective view of an independent cam cylinder 250. The cam cylinder 250 has cam grooves including driving cams 251, 253, and 254 and a buffering cam 252. The driving cam 251 engages with the sliding cylinder 216 to drive the first group 210, as described further below.

In the cam cylinder 250, a region in which the driving cams 251, 253, and 254 and the buffering cam 252 are not formed is removed to form the notch 258. As a result, the lens barrel 200 can be made lighter and the material used for the cam cylinder 250 can be conserved.

Figure 19:
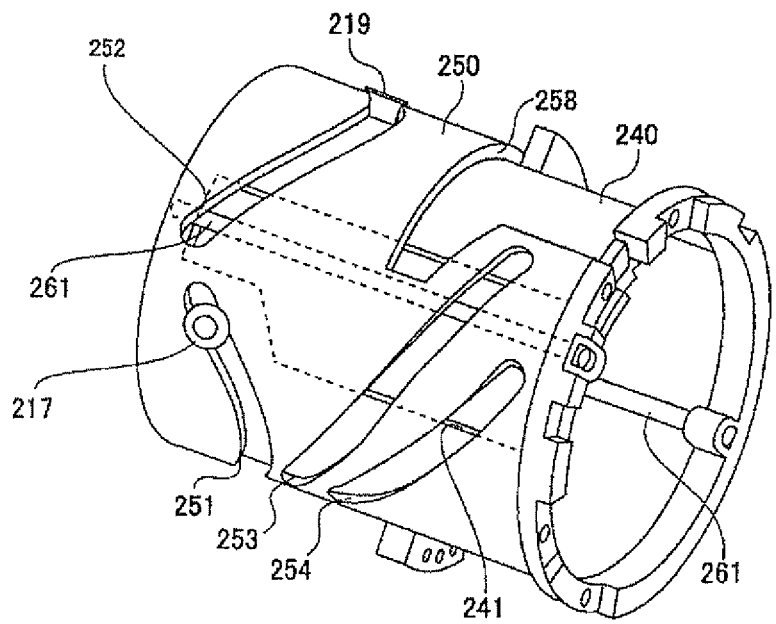
FIG. 19 is a perspective view showing a relationship between the fixed cylinder 240 and the cam cylinder 250.

FIG. 19 is a perspective view showing the relationship between the fixed cylinder 240 and the cam cylinder 250. As shown in FIG. 19, the cam cylinder 250 is mounted along the outer surface of the fixed cylinder 240, and rotates along the circumferential surface of the fixed cylinder 240.

In FIG. 19, a driving cam follower 217 and a buffering cam follower 219 are inserted to the driving cam 251 and the buffering cam 252. The sliding cylinder 216 is connected to the outer ends of the driving cam follower 217 and the buffering cam follower 219.

The driving cam 253 of the cam cylinder 250 drives the second group 260, and the driving cam 254 drives the third group 270. In accordance with this, openings 241 are formed in the fixed cylinder 240 to allow the engaging portion 267 and cam follower 268 of the second group 260 and the engaging portion 277 and cam follower 278 of the third group 270 to move relative to the fixed cylinder 240.

Figure 20:
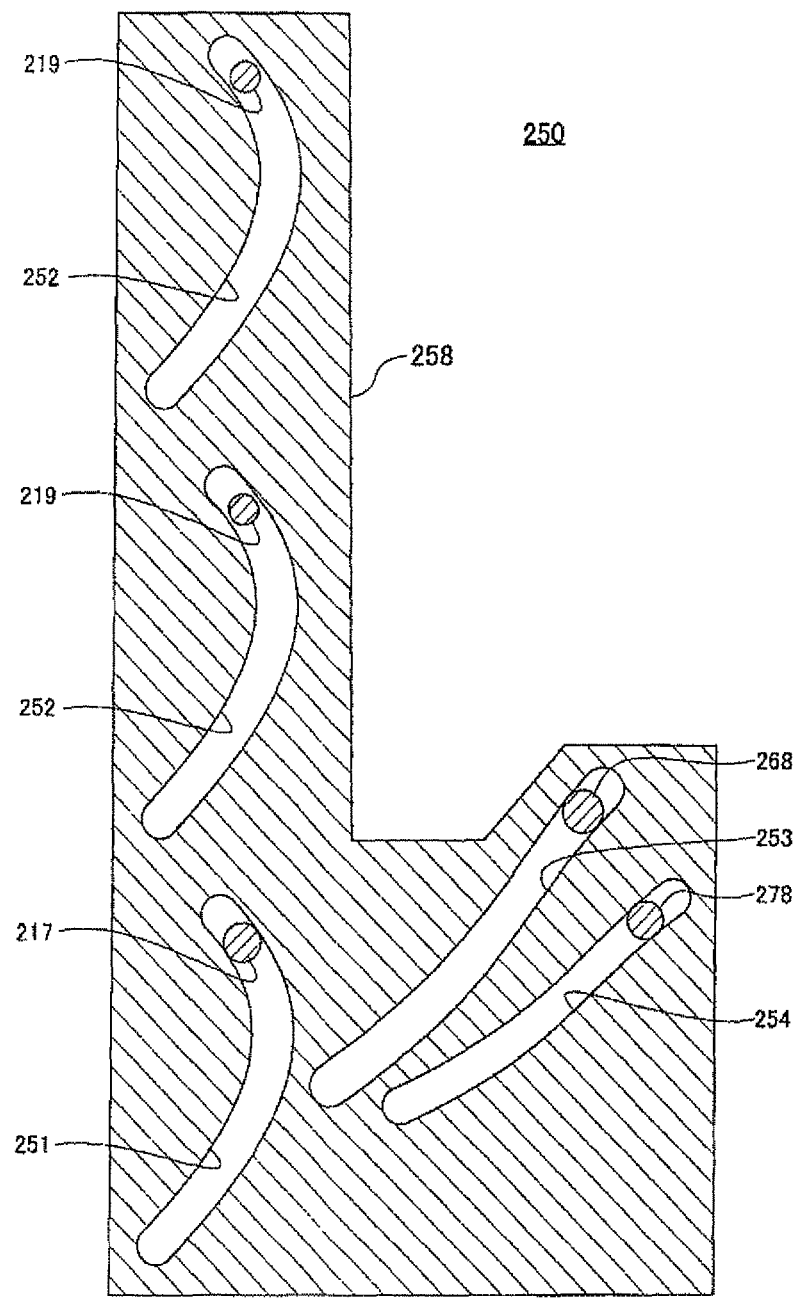
FIG. 20 is a spread view of the cam cylinder 250.

FIG. 20 is a spread view of the cam cylinder 250. FIG. 20 also shows cross sections of the driving cam follower 217 and the buffering cam follower 219 that engage with the driving cam 251 and the buffering cam 252.

As shown in FIG. 20, the driving cam 251 and the buffering cam 252 have the same shape as each other. The driving cams 253 and 254 each have shapes that are different from the driving cam 251 and the buffering cam 252.

The driving cam follower 217 engaging with the cam surface of the driving cam 251 and the buffering cam follower 219 engageable with the cam surface of the buffering cam 252 have different radii. Specifically, the driving cam follower 217 has a radius substantially equal to the width of the driving cam 251. Therefore, the driving cam follower 217 contacts the cam surface of the driving cam 251.

On the other hand, the buffering cam follower 219 has a radius that is smaller than the width of the buffering cam 252. Therefore, a gap is formed between the cam surface of the buffering cam 252 and the buffering cam follower 219.

The cam follower 268 of the second group 260 is inserted into the driving cam 253. The cam follower 278 of the third group 270 is inserted into the driving cam 254. The width of the driving cam 253 and the diameter of the cam follower 268 are substantially the same, and the width of the driving cam 254 and the diameter of the cam follower 278 are substantially the same. As a result, the cam follower 278 is driven along the driving cam 254 and the cam follower 268 is driven along the driving cam 253 according to the rotation of the cam cylinder 250.

Figure 21:
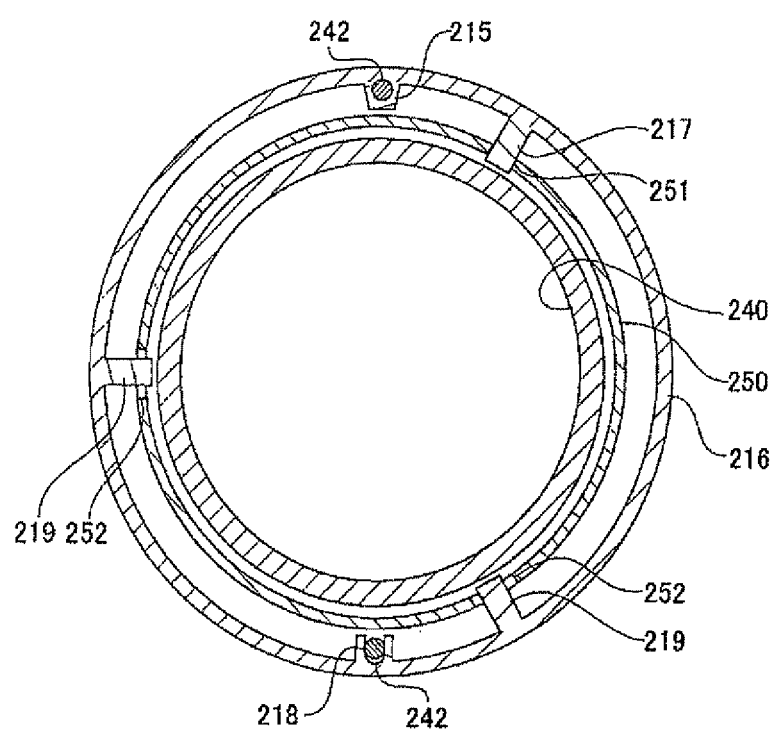
FIG. 21 is a cross-sectional view schematically showing a relationship between the fixed cylinder 240, the cam cylinder 250, and the sliding cylinder 216.

FIG. 21 is a cross-sectional view schematically showing a relationship between the fixed cylinder 240, the cam cylinder 250, and the sliding cylinder 216. As shown in FIG. 21, the cam cylinder 250 is mounted on the outer circumference of the fixed cylinder 240, and the sliding cylinder 216 is arranged on the outer circumference of the cam cylinder 250. The guide bars 242 are between the cam cylinder 250 and the sliding cylinder 216, and are oriented to extend orthogonally from the plane of FIG. 21. The sliding cylinder 216 includes the driving cam follower 217 and the buffering cam follower 219, which protrude toward the optical axis of the lens barrel 200, and the engaging portion 215 and U-shaped groove 218 that engage with the guide bars 242.

The driving cam follower 217 and the buffering cam follower 219 are respectively inserted to the driving cam 251 and the buffering cam 252. It should be noted that although the driving cam follower 217 contacts the cam surface of the driving cam 251, there is a gap between the buffering cam follower 219 and the cam surface of the buffering cam 252.

The driving cam follower 217 is arranged closer to the engaging portion 215 than the buffering cam follower 219 in the circumferential direction. As a result, the drive force received by the driving cam follower 217 can be efficiently transferred to the sliding cylinder 216. Furthermore, tilting of the front lens 211 can be restricted.

A guide bar 242 is inserted into the engaging portion 215, and the guide bar 242 is fixed to the fixed cylinder 240. Accordingly, when the cam cylinder 250 rotates and the driving cam follower 217 is pressed by the driving cam 251, the sliding cylinder 216 does not rotate.

The driving cam follower 217 contacts the cam surface of the driving cam 251, and therefore the sliding cylinder 216 moves along the guide bar 242 as a result of the driving cam 251 driving the driving cam follower 217. Therefore, the lead ring 214, the lens frame 212, and the front lens 211 move integrally with the sliding cylinder 216.

On the other hand, since there is a gap between the cam surface of the buffering cam 252 and the buffering cam follower 219, the buffering cam follower 219 is not driven by the buffering cam 252. However, when an external mechanical load is exerted on the first group, which includes the front lens 211, the lens frame 212, the lead ring 214, and the sliding cylinder 216, such that the driving cam follower 217 or the like is deformed, the buffering cam follower 219 contacts the cam surface of the buffering cam 252 and the load is distributed. As a result, damage to the driving cam 251 and the driving cam follower 217 is prevented.

In this way, a lens barrel 200 is formed that comprises a cam cylinder including a lens holding unit that has a lens frame 212 holding a front lens 211, a lead ring 214, and a sliding cylinder 216; guide bars 242 that guide the movement of the lens holding unit; a driving cam 251 that engages with a driving cam follower 217 of a sliding cylinder 216; and a buffering cam 252 that can engage with a buffering cam follower 219 disposed on the sliding cylinder 216. The cam cylinder 250 drives the lens holding unit along the guide bars 242 as a result of the driving cam follower 217 engaging with the driving cam 251, and there is a gap between the buffering cam follower 219 and the buffering cam 252.

As a result, when an external load affects the first group, the load is dispersed on the buffering cam 252 and the buffering cam follower 219, thereby achieving high practical strength and increasing durability. Accordingly, the front lens 211 can be accurately guided by the guide bars 242 to prevent a decrease in the optical capabilities of the lens barrel 200.

Considering the functions of the buffering cam follower 219 and the buffering cam 252, the driving cam follower 217 and the buffering cam follower 219 are arranged at uniform intervals in a direction around the optical axis C of the lens barrel 200. As a result, the load placed on the first group 210 can be evenly distributed.

The above embodiment describes an example of a first group 210 that frequently experiences loads or shocks from the outside. However, if the lens barrel 200 experiences acceleration, for example, the components in the lens barrel 200 experience the same type of shock as the first group. Accordingly, by adopting the configuration of the first group 210 of the above lens barrel 200, other lens groups or the like can also be protected.

In the above embodiments, the driving cam 251 and the buffering cam 252 have the same width, and a gap is formed between the buffering cam 252 and the buffering cam follower 219 by changing the diameters of the driving cam follower 217 and the buffering cam follower 219. However, the driving cam follower 217 and the buffering cam follower 219 can have the same diameter, and the widths of the driving cam 251 and the buffering cam 252 can be changed to form the gap between the buffering cam 252 and the buffering cam follower 219.

Furthermore, by setting the elasticity of the buffering cam follower 219 to be less than the elasticity of the driving cam follower 217, the shock dispersion effect of the buffering cam follower 219 and the buffering cam 252 can be improved.

Figure 22:
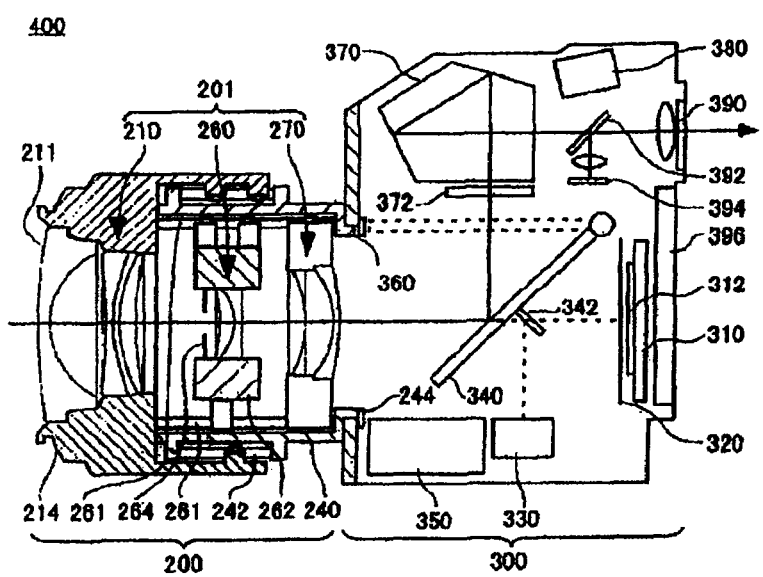
FIG. 22 schematically shows the configuration of the image capturing device 400 including the lens barrel 200.

FIG. 22 is a schematic view of an image capturing device 400 provided with the lens barrel 200. In order to prevent FIG. 22 from being overly complex, the lens barrel 200 is shown schematically. However, the lens barrel 200 shown in FIG. 22 has the same configuration as the lens barrel 200 described in FIG. 17. Therefore, components that are the same as those in FIG. 17 are given the same reference numerals and redundant explanation is omitted.

The lens barrel 200 is detachably mounted on a mount section 360 of the image capturing unit 300. In the image capturing device 400, the lens barrel 200 and the image capturing unit 300 are electrically connected to each other via connection terminals, not shown. In this way, the lens barrel 200 receives power from the image capturing unit 300. Furthermore, the lens barrel 200 may include a secondary control unit that exchanges signals with the main control section 350 of the image capturing unit 300.

In the embodiment shown in FIGS. 17 to 21, the first group 210 is moved by the male lead 213 and the lead ring 214 when focusing, but the focusing method is not limited to this, and the first group 210 may move linearly along the guide bars 242. Furthermore, the second group 260 and the third group 270 can be configured to include a buffering cam 252 and a buffering cam follower 219, in the same manner as the first group 210.

The image capturing unit 300 houses a main control section 350 and an optical system that includes a main mirror 340, a pentaprism 370, and a finder optical system 390. The main mirror 340 moves between a standby position, in which the main mirror 340 is oriented diagonally in the optical path of incident light through the image capturing optical system 201 of the lens barrel 200, and an image capture position, which is shown by the dotted line in FIG. 22 and in which the main mirror 340 is raised out of the optical path of the incident light.

When in the standby position, the main mirror 340 guides a majority of the incident light to a focusing screen 372 arranged thereabove. The focusing screen 372 is arranged at a focal position of the image capturing optical system 201 of the lens barrel 200 to create an image formed by the image capturing optical system 201.

The image created by the focusing screen 372 can be seen from the finder optical system 390 via the pentaprism 370. Therefore, the image on the focusing screen 372 can be seen as a normal image from the finder optical system 390.

A half mirror 392 is arranged between the pentaprism 370 and the finder optical system 390, and this half mirror 392 superimposes the display image formed by the finder LCD 394 onto the image of the focusing screen 372. As a result, the image seen at the output end of the finder optical system 390 is a combination of the image of the focusing screen 372 and the image of the finder LCD 394. The finder LCD 394 displays information concerning image capturing conditions, setting conditions, and the like of the image capturing device 400.

A portion of the light output from the pentaprism 370 is guided to the photometric unit 380. The photometric unit 380 measures the intensity of the light and a distribution or the like thereof, and these measurement results are referenced when determining the image capturing conditions.

The back surface of the main mirror 340, which is opposite the incident surface that receives the incident light, has a secondary mirror 342. The secondary mirror 342 guides a portion of the incident light passing through the main mirror 340 to a distance measuring section 330 positioned therebelow. Therefore, when the main mirror 340 is in the standby position, the distance measuring section 330 detects a focal point position that is suitable for the subject. When the main mirror 340 moves to the image capture position, the secondary mirror 342 also moves out of the optical path of the incident light.

A shutter 320, an optical filter 312, and an image capturing element 310 are arranged on the optical axis behind the main mirror 340 relative to a direction of the incident light from the lens barrel 200. When the shutter 320 is open, the main mirror 340 moves to the image capture position immediately therebefore, and so the incident light progresses to be incident to the image capturing element 310. As a result, the image formed by the incident light is converted into an electric signal by the image capturing element 310.

The image capturing unit 300 is provided with a main LCD 396 facing outward on a back surface of the lens barrel 200. The main LCD 396 displays various types of setting information concerning the image capturing unit 300, and also displays the image formed by the image capturing element 310 when the main mirror 340 is in the image capture position.

The main control section 350 performs overall control of the various operations described above. Furthermore, an auto-focus mechanism can be formed that drives the lens barrel 200 while referencing information concerning the distance to a subject as detected by the distance measuring section 330 of the image capturing unit 300. As another example, an auto-focus mechanism can be formed by the distance measuring section 330 referencing the movement amount of the lens barrel 200.

In this way, the image capturing device 400 can be formed to include the lens barrel 200 having the buffering cam 252 and the buffering cam follower 219. The effect of the lens barrel 200 can be realized for the image capturing device 400 in this way. However, the use of the lens barrel 200 is not limited to this. For example, the lens barrel 200 can be used for a focusing mechanism, a zoom mechanism, or the like in an optical system such as a moving image capturing mechanism, a binocular telescope, a microscope, a surveying instrument, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The invention claimed is:

1. A lens barrel comprising:
   a first guide shaft that is disposed within a cylindrical fixed cylinder and oriented along an axial direction of the fixed cylinder;
   a second guide shaft that is disposed outside the fixed cylinder and oriented along the axial direction, and arranged such that at least a portion thereof overlaps with at least a portion of the first guide shaft in a longitudinal direction of the first guide shaft;
   a first holding member that holds a first lens, includes a first engaging member that engages with the first guide shaft, and moves along the first guide shaft; and
   a second holding member that holds a second lens, includes a second engaging member that engages with the second guide shaft, and moves along the second guide shaft, wherein
   at least a portion of movement range of the first engaging member on the first guide shaft overlaps in the axial direction with at least a portion of movement range of the second engaging member on the second guide shaft.

2. The lens barrel according to claim 1, further comprising a driving member that is arranged between the first guide shaft and the second guide shaft and commonly drives the first holding member and the second holding member.

3. The lens barrel according to claim 2, wherein
   the first holding member includes a first cam follower and the second holding member includes a second cam follower, and
   the driving member is a cam cylinder that engages with the fixed cylinder and that includes a first cam groove engaging with the first cam follower and a second cam groove engaging with the second cam follower.

4. The lens barrel according to claim 1, wherein
   length over which the first engaging member engages with the first guide shaft is constant, regardless of a position at which the first engaging member engages with the first guide shaft, and
   length over which the second engaging member engages with the second guide shaft is constant, regardless of a position at which the second engaging member engages with the second guide shaft.

5. The lens barrel according to claim 1, wherein
   the first guide shaft and the second guide shaft are fixed to the fixed cylinder at a plurality of locations on the guide shafts.

6. The lens barrel according to claim 1, wherein
   at least one of the first guide shaft and the second guide shaft is a pair of guide shafts oriented in parallel with an axial direction orthogonal to a radial direction of the fixed cylinder.

7. The lens barrel according to claim 1, wherein
   at least one of (i) positions in a direction of an optical axis of the first lens and the first engaging member and (ii) positions in the direction of the optical axis of the second lens and the second engaging member are skewed in the direction of the optical axis.

8. The lens barrel according to claim 7, wherein
   the second lens is arranged further on a subject side than the second engaging member.

9. The lens barrel according to claim 7, wherein
   when the second lens is arranged further on an image side of the first lens than the second engaging member, the first lens is arranged further on the image side than the first engaging member.

10. An image capturing device comprising:
    the lens barrel according to claim 1; and
    an image capturing unit that captures an image using an optical system including the first lens and the second lens.

11. The lens barrel according to claim 1, wherein
    the second lens is positioned on a subject side of the first lens.

12. A method of manufacturing a lens barrel, comprising:
    providing a first guide shaft that is disposed within a cylindrical fixed cylinder and oriented along an axial direction of the fixed cylinder;
    providing a second guide shaft that is disposed outside the fixed cylinder and oriented along the axial direction, and arranged such that at least a portion thereof overlaps with at least a portion of the first guide shaft in a longitudinal direction of the first guide shaft;
    providing a first holding member that holds a first lens, including a first engaging member that engages with the first guide shaft, and moves along the first guide shaft; and
    providing a second holding member that holds a second lens, includes a second engaging member that engages with the second guide shaft, and moves along the second guide shaft, wherein
    at least a portion of movement range of the first engaging member on the first guide shaft overlaps in the axial direction with at least a portion of movement range of the second engaging member on the second guide shaft.

13. The method of manufacturing according to claim 12, further comprising providing a driving member that is arranged between the first guide shaft and the second guide shaft and commonly drives the first holding member and the second holding member.

14. The method of manufacturing according to claim 13, wherein
    the first holding member includes a first cam follower and the second holding member includes a second cam follower, and
    the driving member is a cam cylinder that engages with the fixed cylinder and that includes a first cam groove engaging with the first cam follower and a second cam groove engaging with the second cam follower.

15. The method of manufacturing according to claim 12, wherein
    length over which the first engaging member engages with the first guide shaft is constant, regardless of a position at which the first engaging member engages with the first guide shaft, and
    length over which the second engaging member engages with the second guide shaft is constant, regardless of a position at which the second engaging member engages with the second guide shaft.

16. The method of manufacturing according to claim 12, wherein
    the first guide shaft and the second guide shaft are fixed to the fixed cylinder at a plurality of locations on the guide shafts.

17. The method of manufacturing according to claim 12, wherein
    at least one of the first guide shaft and the second guide shaft is a pair of guide shafts oriented in parallel with an axial direction orthogonal to a radial direction of the fixed cylinder.

18. The method of manufacturing according to claim 12, wherein
at least one of (i) positions in a direction of an optical axis of the first lens and the first engaging member and (ii) positions in the direction of the optical axis of the second lens and the second engaging member are skewed in the direction of the optical axis.

19. The method of manufacturing according to claim 18, wherein
the second lens is arranged further on a subject side than the second engaging member.

20. The method of manufacturing according to claim 18, wherein
when the second lens is arranged further on an image side of the first lens than the second engaging member, the first lens is arranged further on the image side than the first engaging member.

21. A method of manufacturing an image capturing device, comprising:
the method of manufacturing the lens barrel according to claim 12; and
providing an image capturing unit that captures an image using an optical system including the first lens and the second lens.

22. The method of manufacturing according to claim 12, wherein
the second lens is positioned on a subject side of the first lens.

* * * * *